March 15, 1960 B. G. CASE ET AL 2,928,217
PROCESS AND APPARATUS FOR WRAPPING BALES
Filed Dec. 9, 1957 2 Sheets-Sheet 1
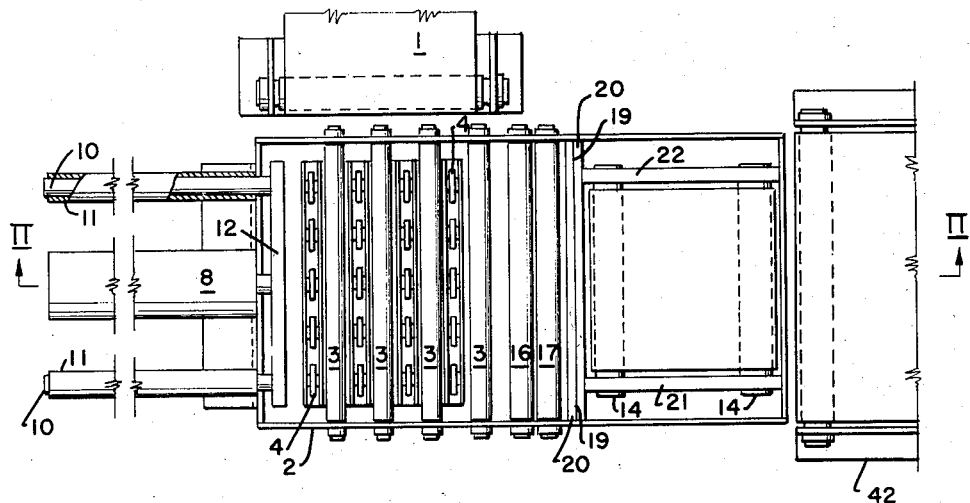
FIG. I
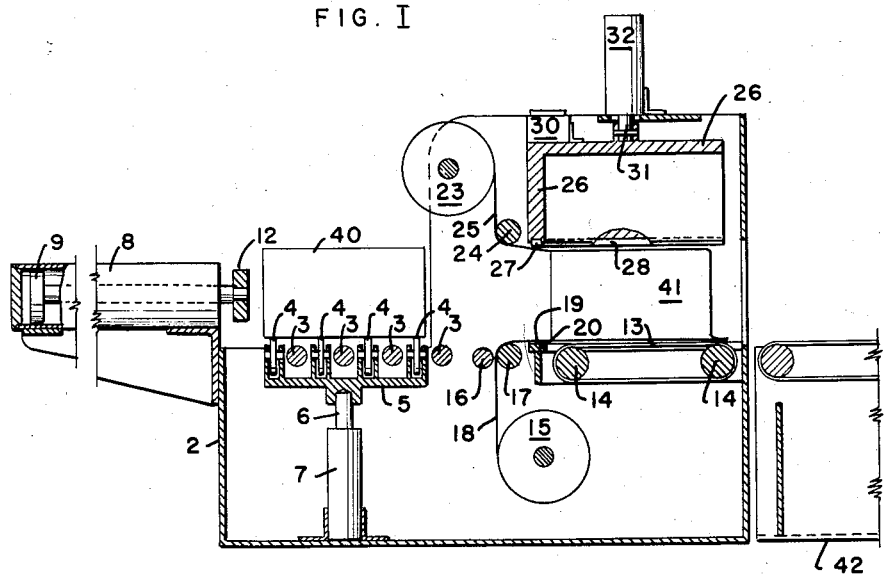
FIG. II
INVENTORS
BRUCE G. CASE
HANS COSTER
BY *H. D. Birch*
THEIR ATTORNEY March 15, 1960   B. G. CASE ET AL   2,928,217
PROCESS AND APPARATUS FOR WRAPPING BALES
Filed Dec. 9, 1957   2 Sheets-Sheet 2
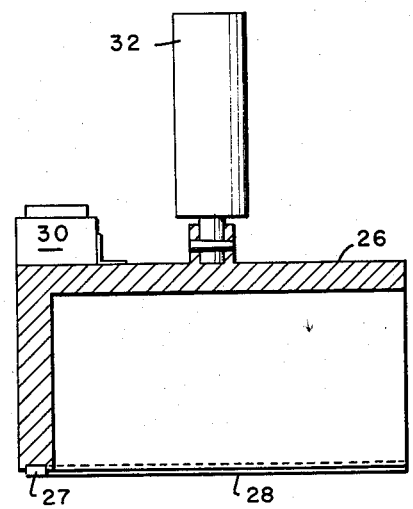
FIG. IV
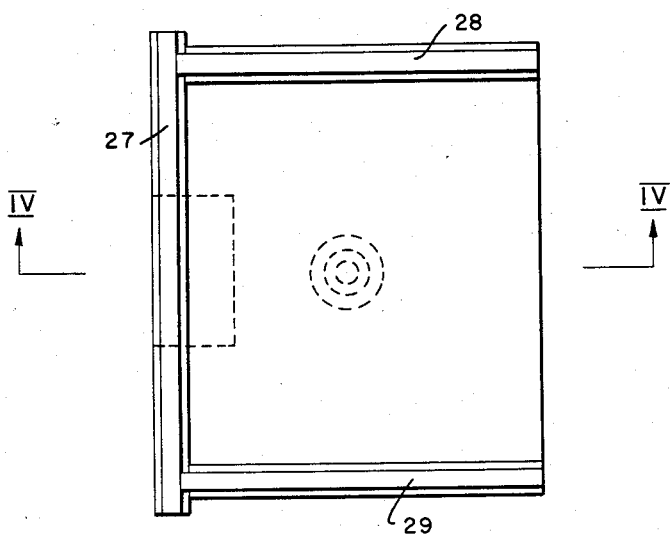
FIG. III
INVENTORS
BRUCE G. CASE
HANS COSTER
BY *A. D. Burch*
THEIR ATTORNEY

United States Patent Office 2,928,217
Patented Mar. 15, 1960

2,928,217

PROCESS AND APPARATUS FOR WRAPPING BALES

Bruce G. Case, Los Angeles, and Hans Coster, Torrance, Calif., assignors to Shell Oil Company, a corporation of Delaware Application December 9, 1957, Serial No. 701,483

3 Claims. (Cl. 53—28)

This invention relates to improvements in methods and apparatus for wrapping plastic film around an object or stack of objects and more particularly it relates to novel and improved methods and apparatus for encasing objects with a plastic film which is sealed on all edges.

The wrapping of objects with a thermoplastic film such as polyethylene, styrene, isobutylene copolymers and the like, is becoming increasingly popular as these wrapping materials have certain advantages over wraps made of cellophane or paper.

These thermoplastic films are generally made quite thin owing to their relatively higher cost. The films are difficult to handle in ordinary wrapping machinery in part due to their extreme pliable nature.

Some success has been achieved by thermally sealing the packages at the ends thereof. However, when dealing with some goods such as bales of raw synthetic rubber which have cold flow properties, the wrapping and sealing of the wrapper at the ends leaving an unsealed lap joint on the sides has not proven satisfactory due to the deformation of the wrapped bale on storing or stacking. Often the edges of the film tend to fold back before the packaging operation is completed. The raw rubber on being exposed adheres to other bales or the package container leading to difficult handling. It is therefore an object of our invention to provide a process and apparatus for wrapping bales and other objects with a plastic film which is thermally sealed on all meeting or lapping edges.

Another object of our invention is to provide a process and apparatus for wrapping bales and other objects with a plastic film in which two continuous sheets of plastic film are employed.

Another object of our invention is to provide a process and apparatus wherein bales or other objects may be continuously wrapped with a plastic film which is sealed off between each bale and at the sides simultaneously.

The other objects and advantages of our invention will be apparent to those skilled in the art from the following description of a specific embodiment of our invention in which reference is had to the accompanying drawings.

In general our invention provides for bales to be encased by providing two parallel continuous sheets of film to be positioned above and below a travelling line of bales and for thermal sealing bars to weld or seal the two sheets of film together at a designated station whereby the bales are encased.

Fig. I is a schematic plan view of apparatus with the upper half of the sealer unit removed.

Fig. II is an elevation taken along the line II—II of Fig. I and with the upper half of the sealer unit and bales in position.

Fig. III is a bottom plan view of the upper half of the sealer unit.

Fig. IV is a sectional elevation taken along the line IV—IV of Fig. III.

Referring to Figs. I and II numeral 1 represents the end of a feed conveyor of the usual endless belt or roller type used for conveying packages from one point in a plant to another. The end of the conveyor is located close to a transfer table indicated generally by 2. The transfer table comprises a group of rollers 3 arranged at right angles to the direction of feed from the conveyor end 1. Parallel to the direction of feed from the conveyor are wheels 4 so mounted on a vertically movable carriage 5 so that their individual axes are at right angles to the axes of the rollers 3. The carriage 5 with its wheels is attached to a piston rod 6 which is moved vertically by an air operated piston enclosed in a cylinder 7 located below the carriage 5.

At the left side of the transfer table and above its top surface is a ram mechanism. The ram comprises a ram cylinder 8 having a piston 9. Ram guides comprising rods 10 sliding in tubular guides 11 having slightly larger internal diameter than the diameter of the rods. The rods 10 of the ram guides are connected at their external ends closest to the carriage 5 to the back of a pusher plate 12. A piston rod connects the piston 9 to the center of the pusher plate 12. At the side of the transfer table opposite the ram is located a horizontal conveyor 13 of the endless belt type located at the same vertical height as the top of the transfer table. This conveyor hereinafter called the sealer conveyor has its driving rollers 14 parallel to the rollers 3 of the transfer table 2. Located below the sealer conveyor 13 is a roll 15 of polyethylene film mounted on suitable bearings called hereinafter the lower film feed roll. Two lower guides 16 and 17 for the film 18 are located at approximate transfer table height close to the end of the sealer conveyor 13 but spaced therefrom. Between the guide 17 and the end of the sealer conveyor 13 is located, at table height, a transverse lower sealer bar 20 which has a semi-resilient upper surface with a rigid wire or rod 19 passing longitudinally along the surface. Two lower sealer bars 21 and 22 are mounted at right angle to sealer bar 20 at the sides of the sealer conveyor. These bars have semi-resilient upper surfaces similar to sealer bar 20 but do not necessarily have a similar rigid wire, although such may be included for certain packaging operations. Mounted on suitable bearings and elevated above the sealer conveyor at a desired distance is located a roll of film 23 called hereinafter the upper film feed roll. This roll is wider than the lower film feed roll 15.

A suitable guide 24 for the film 25 is located between the upper film feed roll and the upper surface of the sealer conveyor. Located directly over the sealer conveyor is a U-shaped framework indicated generally by numeral 26 so positioned that the lower surfaces of the framework form a horizontal U above the sealer conveyor. The side arms of the U are vertically above the lower side sealer bars 21 and 22 and the base of the U is positioned above the lower sealer bar 18. Mounted on the lower surfaces of the framework are upper sealer bars 27, 28 and 29. Each sealer bar consists of a metal strip of low heat capacity covered by a suitable heat-resisting, non-metallic covering. The upper sealer bars are connected by suitable electrical conduits (not shown) to an electronic timer and transformer unit 30 operated from a suitable alternating electric current source. The top of the framework 26 is attached to the piston rod 31 of a piston encased in a cylinder 32 mounted so as to move the framework 26 vertically downward upon the application of air or other medium under pressure to the upper surface of the piston. Bales in transit through the machine are indicated by numerals 40 and 41.

The operation of the apparatus is as follows: a bale 40 to be encased travels along the conveyor 1, passes onto the transfer table 2 and is supported thereon by means of the series of wheels 4. The carriage 5 during this period of operation is in raised position elevating the wheels above the height of the rollers 3. The carriage is supported by the piston rod 6 which is at this time in extended position from the cylinder 7 by reason of air under pressure being admitted to the cylinder below its piston. The control of air supply to the cylinder can be effected by operation of a limit switch activated by the bale itself as will be apparent to those skilled in the art. Upon the bale becoming positioned on the transfer table the piston rod is retracted into the cylinder 7 by release of air pressure so that the wheels are withdrawn below the upper surface of the rollers 3. Thereupon, through other limit switch means, air is admitted to cylinder 8 whereby piston 9 attached by means of a piston rod to pusher plate 12 moves horizontally to advance the bale now supported on rollers 3 onto the sealer conveyor 13. The endless belt of the sealer conveyor is intermittently operated by means of limit switches or other known movement control mechanism. The bale in advancing to its new position on the sealer conveyor pushes a curtain of polyethylene or other thermoplastic film around the front, bottom and top surfaces of the bale. This curtain of film comprises two widths of film and is made by joining the free end of a film fed from the lower roll 15 with the free end of film fed from upper roll 23. The lower sheet of film 18 passes between guides 16 and 17 and the upper sheet of film 25 passes over guides 24. A bale 41 is shown in Fig. II in position on the sealer conveyor.

The upper film 25 is of width greater than the sum of the width of the bale and twice the height of the bale. The lower film 18 is of a width greater than the width of the bale. With the bale in position as stated, limit switches cause the piston rod 31 in the cylinder 32 to move downward under air pressure thus lowering the U-shaped framework 26 carrying the upper sealer bars 27, 28 and 29, until they make contact with the lower sealer bars 20, 21 and 22. The upper polyethylene film 25 extending beyond the upper side edges of the bale is forced downward by the side arms of the U-shaped frame.

As will be apparent, the upper film 25 is also forced downward over the after end of the bale. The lower film 18 will overlay the lower sealer bars 20, 21 and 22. Upon the upper sealer bars (with the two sheets of polyethylene between) contacting the lower sealer bars, a flow of electrical current through the metal strip in the upper sealer bars is induced for a short period, generally less than a second, causing the strip to instantaneously heat the films to their welding temperature whereupon the films become welded together. The sealer bars are kept in contact for a period thereafter sufficient to allow the welds to cool under pressure and to develop its full strength. The lower sealer bar 20 at the trailing end of the bale, it will be recalled, has a rigidly supported wire 19 passing longitudinally down the middle of the bar at its surface. Upon contact of the upper sealer bar 27 with the generally resilient surface of the lower sealer, the wire, upon the film becoming molten under the welding heat, will force its way through the polyethylene. Upon separation of the sealer bars 20 and 27 the upper and lower films will have been welded together and the weldment divided down its center.

The U-shaped framework 26 carrying the upper sealer bars returns to its raised position and the now completely encased bale is advanced by the sealer conveyor on to another conveyor 42 which carries the bale to a loading station. The cycle above-described is repeated with the next bale delivered by the transfer table.

It will be seen that we have provided a means by which bales of raw synthetic rubber or other bales can be completely encased in a film of polyethylene which is welded on all sides. As a result the possibility of the material of the bales coming into contact with the material of an adjacent bale is greatly reduced.

The system of encasing bales by sealing on three sides and splitting one weldment to make four welded seams results in a simple and relatively more inexpensive machine with less servicing requirements.

In the accompanying drawings we have not shown the circuitry for the limit switches used to operate the various rams and other means for moving the bales through the apparatus or for controlling the time the sealer units are in contact. All these elements are well known to those skilled in the art.

We claim as our invention:

1. Process for encasing bales in plastic film comprising horizontally advancing a bale to be wrapped against a vertical hanging sheet of film, said sheet of film having an upper section of a width greater than the width of the bale plus twice the height of the bale and a lower section of a width greater than the width of the bale so that the film sheet encases the bale on three surfaces, simultaneously welding said film sheet at the sides and after end of the bale and thermally severing the film sheet so that the encased bale is detached and a vertically hanging sheet of film again formed.

2. Process for encasing bales in plastic film as set forth in claim 1 wherein excess film sheet at the sides is simultaneously thermally severed.

3. An apparatus for encasing bales in plastic film comprising: a conveyor having a horizontal, movable top surface, a guide for feeding a first continuous plastic sheet in the direction of movement of said top surface and in contact therewith, a second wider guide for feeding a second continuous plastic sheet of wider dimension parallel to said first-mentioned plastic sheet at a vertical distance above said top surface, bar thermal sealing elements arranged for simultaneous operation located at the sides and rearward end of said conveyor top surface, complementary thermal sealing elements located vertically above said first-mentioned thermal sealing elements, means to bring said heating elements into clamping position after a bale is positioned on said horizontal conveyor surface to encase the positioned bale and simultaneously form a separate hanging curtain of plastic film comprising said first and second plastic sheets, and a pusher device for advancing a second bale against the hanging curtain.

References Cited in the file of this patent

UNITED STATES PATENTS

| 2,525,651 | Clunon | Oct. 10, 1950 |
| 2,546,059 | Cloud | Mar. 20, 1951 |
| 2,549,122 | Osterhof | Apr. 17, 1951 |
| 2,606,412 | Salfisberg | Aug. 12, 1952 |
| 2,690,593 | Abercrombie | Oct. 5, 1954 |
| 2,741,885 | Allison | Apr. 17, 1956 |
| 2,767,535 | Bentley | Oct. 23, 1956 |